United States Patent [19]

Grossman et al.

[11] Patent Number: 5,205,913
[45] Date of Patent: Apr. 27, 1993

[54] PROCESS OF $^{196}$HG ENRICHMENT

[75] Inventors: Mark W. Grossman, Belmont; Charles E. Mellor, Salem, both of Mass.

[73] Assignee: GTE Products Corporation, Danvers, Mass.

[21] Appl. No.: 732,866

[22] Filed: Jul. 18, 1991

Related U.S. Application Data

[63] Continuation of Ser. No. 526,952, May 21, 1990, which is a continuation of Ser. No. 289,644, Dec. 23, 1988, abandoned.

[51] Int. Cl.$^5$ ............................................. B01D 5/00
[52] U.S. Cl. .......................... 204/157.22; 204/157.2; 204/157.21
[58] Field of Search ............ 204/157.22, 157.2, 157.21

[56] References Cited

U.S. PATENT DOCUMENTS

| | | | |
|---|---|---|---|
| 3,872,349 | 3/1975 | Spero et al. | 315/39 |
| 3,897,331 | 7/1975 | Smith et al. | 209/10 |
| 3,983,019 | 9/1976 | Botter nee Bergheaud | 204/157 R |
| 3,993,911 | 11/1976 | Graentzel | 422/186.3 X |
| 4,188,591 | 2/1980 | Siegman et al. | 372/70 X |
| 4,193,879 | 3/1980 | Leach | 250/527 |
| 4,379,252 | 4/1983 | Work | 313/485 |
| 4,514,363 | 4/1985 | Durbin | 423/3 |
| 4,527,086 | 7/1985 | Maya | 313/485 |
| 4,678,550 | 7/1987 | Grossman | 204/105 R |
| 4,713,547 | 12/1987 | Grossman | 250/373 |
| 4,789,784 | 12/1988 | Grossman et al. | 204/157.2 |
| 4,800,284 | 1/1989 | Grossman et al. | 250/505.1 |
| 4,839,524 | 6/1989 | Grossman et al. | 250/505,1 |
| 4,933,120 | 6/1990 | D'Amato et al. | 264/13 |
| 4,963,783 | 10/1990 | Grossman | 313/22 |
| 5,061,353 | 10/1991 | Grossman | 204/157.22 |

FOREIGN PATENT DOCUMENTS

| | | |
|---|---|---|
| 280788 | 12/1987 | European Pat. Off. . |
| 281687 | 12/1987 | European Pat. Off. . |
| 0156428 | 2/1984 | Japan . |
| 1435544 | 11/1988 | U.S.S.R. ............... 422/186.3 |

OTHER PUBLICATIONS

Grossman U.S.S.N. 815,150—filed: Dec. 31, 1985.
Waymouth, Electric Discharge Lamps, MIT Press (1971).
Webster and Zare, J. Phys. Chem. 85: 1302-1305 (1981).
Gunning & Swartz, Adv. Photochem. 1:209 (1963).
Maya et al., Science 26: 435-436 (1984).

Primary Examiner—Donald P. Walsh
Assistant Examiner—Ngoclan T. Mai
Attorney, Agent, or Firm—Robert E. Walter

[57] ABSTRACT

A simple rate equation model shows that by increasing the length of the photochemical reactor and/or by increasing the photon intensity in said reactor, the feedstock utilization of $^{196}$Hg will be increased. Two preferred embodiments of the present invention are described, namely (1) long reactors using long photochemical lamps and vapor filters; and (2) quartz reactors with external UV reflecting films. These embodiments have each been constructed and operated, demonstrating the enhanced utilization process dictated by the mathematical model (also provided).

1 Claim, 8 Drawing Sheets

REACTOR CHAMBER

FIG. 3B

FILM

STOPPERED ENDS

FILM REMOVED

REACTOR PREPARED FOR FIRST AL COATING

*FIG. 4*

RELATIVE POSITION OF SOURCE
AND VESSEL TO BE COATED

*FIG. 5*

BATCH MODEL

PROCESS OF $^{196}$HG ENRICHMENT

STATEMENT OF GOVERNMENT INTEREST

The Government of the United States of America has rights in this invention pursuant to Subcontract 4540710 under Prime Contract DE-AC03-76SF00098 awarded by the Department of Energy.

This is a continuation of copending application Ser. No. 07/526,952 filed May 21, 1990, which is a continuation of Ser. No. 07/289,644, filed Dec. 23, 1988, now abandoned.

FIELD OF THE INVENTION

The present invention is directed to a method and apparatus useful in the isotopic enrichment of a predetermined isotope of mercury (Hg) from a naturally occurring mercury mixture. While the present invention may be used in the enrichment of any one of the seven naturally occurring isotopes of mercury ($^{202}$Hg, $^{200}$Hg, $^{199}$Hg, $^{201}$Hg, $^{198}$Hg, $^{204}$Hg, and $^{196}$Hg,) it has particularly advantageous application in the enrichment of the $^{196}$Hg isotope, which has a natural abundance of only about 0.146 percent.

BACKGROUND OF THE INVENTION

Many devices utilize mercury in their operation, particularly in the field of electric lamps and lighting. Such devices include arc discharge lamps which typically employ mercury as one of the vaporizable components therein. See, for example, Waymouth, *Electric Discharge Lamps*, MIT Press 1971 for a description of the basic principles of such lamps.

In U.S. Pat. No. 4,379,252, (the '252 patent), the advantages of utilizing higher than normal levels of $^{196}$Hg in the Hg added to fluorescent lamps are described and include unexpectedly high efficiency gains in light output. The disclosure of this patent is hereby incorporated herein by reference.

The drawback of using this isotope lies in its high cost. For example, using conventional enrichment techniques, mercury which has been enhanced to contain about 35% of the $^{196}$Hg isotope can cost about $500 per milligram. While only sub-milligram quantities of this isotope need be added to an incandescent lamp to afford beneficial results, economic realities always play a part in consumer products. Accordingly, it is easy to understand why more economical methods of obtaining this isotope continue to be sought.

Isotopically enriched mercury can be produced by a number of methods. One method involves photosensitized chemical reactions utilizing elemental mercury and various compounds. The compounds HCl and $O_2$ react with mercury atoms when the mercury atoms are excited by resonance radiation, in particular, 2537 Å radiation produced in a Hg $(^3 - ^1S_o)$ transition generating isotopically selective reactions. Thus, the Hg compound formed contains Hg enriched in a particular isotope, and the Hg must be separated from the compound into its liquid or free state (i.e., elemental Hg)) in order to recover the isotopically enriched metal.

The following documents are recited as general background information with respect to the subject matter of the present invention. To the extent deemed necessary by artisans of ordinary skill in the art to which this invention pertains, the teachings of these documents are hereby incorporated herein by reference.

Grossman, U.S. Pat. No. 4,713,547;
Grossman et al., U.S. Pat. No. 4,678,550;
Maya, U.S. Pat. No. 4,527,086;
Durbin, U.S. Pat. No. 4,514,363;
Work et al., U.S. Pat. No. 3,379,252;
Botter nee Bergheaud et al., U.S. Pat. No. 3,983,019;
Smith et al., U.S. Patent No. 3,897,331;
Grossman et al., U.S. Ser. No. 815,150, filed Dec. 31, 1985;
European Patent Publication No. 0 281 687, published Sep. 14, 1988, claiming priority of U.S. Ser. No. 947,217, filed Dec. 29, 1986;
European Patent Publication No. 0 280 788, published Sep. 14, 1988, claiming priority of U.S. Ser. No. 947,216, filed Dec. 29, 1986.

SUMMARY OF THE INVENTION

The present invention is directed to an improved photochemical reactor useful for the isotopic enrichment of a predetermined isotope of mercury, especially, $^{196}$Hg.

A simple rate equation model has been developed which shows that by increasing the length of the photochemical reactor, and/or by increasing the photon intensity in said reactor, the feedstock utilization of $^{196}$Hg in said feedstock is increased.

In one preferred embodiment, higher photon utilization and improved excitation selectivity has been achieved through the use of an outside reflecting surface placed on a photochemical reactor used in $^{196}$Hg isotope separation.

It has further been discovered that the use of photoresist masking permits the complete coating of the outside of quartz vessels, but prevents coating of the inside of the vessels. This discovery has been applied in the coating of a quartz reactor chamber to enhance the performance of a photochemical mercury isotope separation system.

Long photoreactors, long photochemical lamps and vapor filters, quartz reactors with external UV reflecting films have been designed according to the principles of this invention, and each have been operated to demonstrate the enhancement of the feedstock utilization process.

DETAILED DESCRIPTION OF THE PREFERRED EMBODIMENTS

The present invention is directed to an improved photochemical reactor useful for the isotopic enrichment of a predetermined isotope of mercury, especially, $^{196}Hg$.

Figure 1:
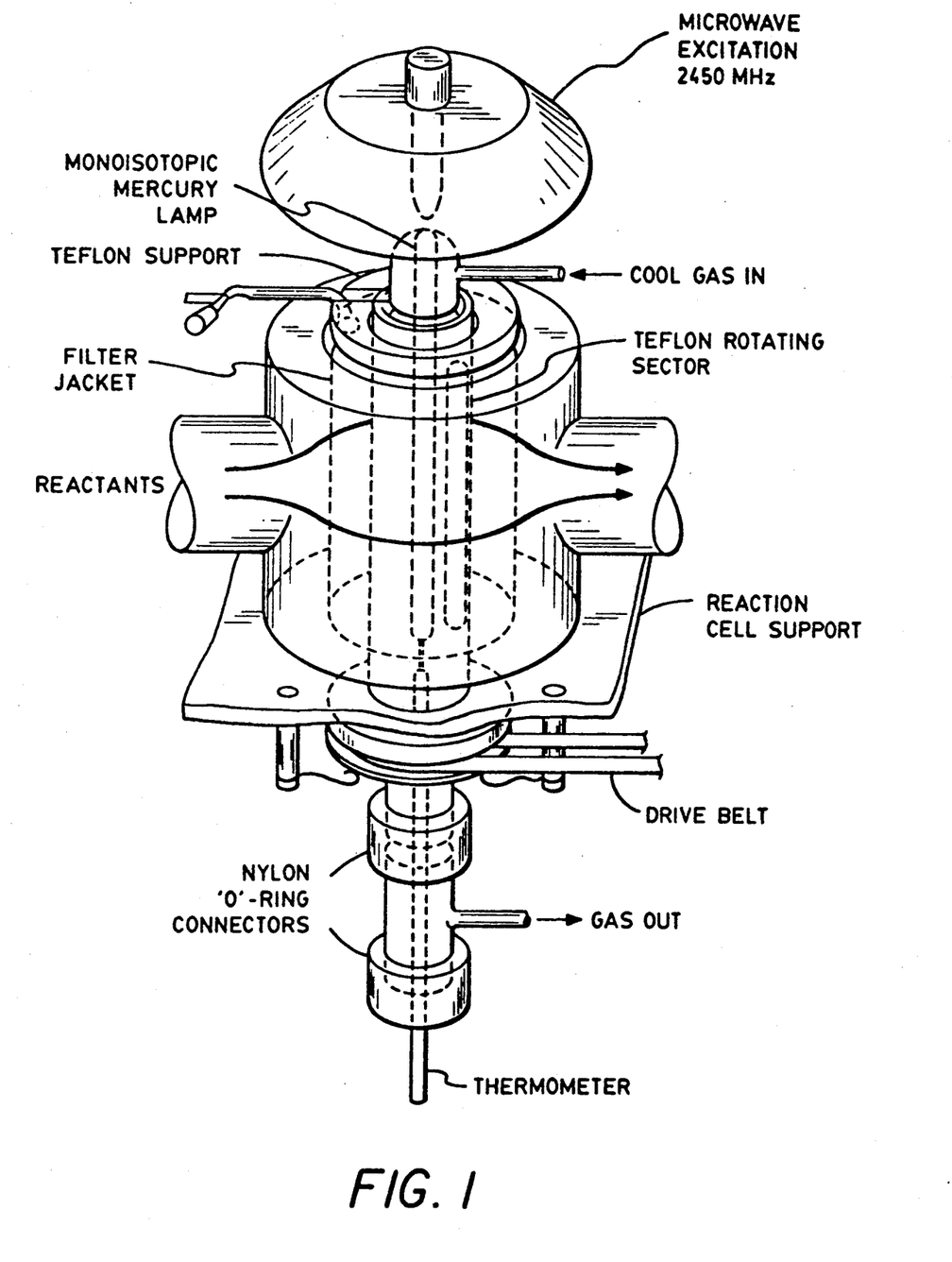
FIG. 1 illustrates the monoisotopic lamp and reaction cell of Webster and Zare from "Photochemical Isotope Separation of Hg-196 by Reaction with Hydrogen Halides," *J. Phys. Chem.*, 85: 1302–1305 (1981), the teachings of which are hereby incorporated herein by reference.

Previous photochemical reactors, such as that of FIG. 1, which is described in Webster and Zare's publication, *J. Phys. Chem.*, 85: 1302 (1981) utilized a Pyrex outer vessel so that any impinging radiation would be absorbed.

Figure 2:
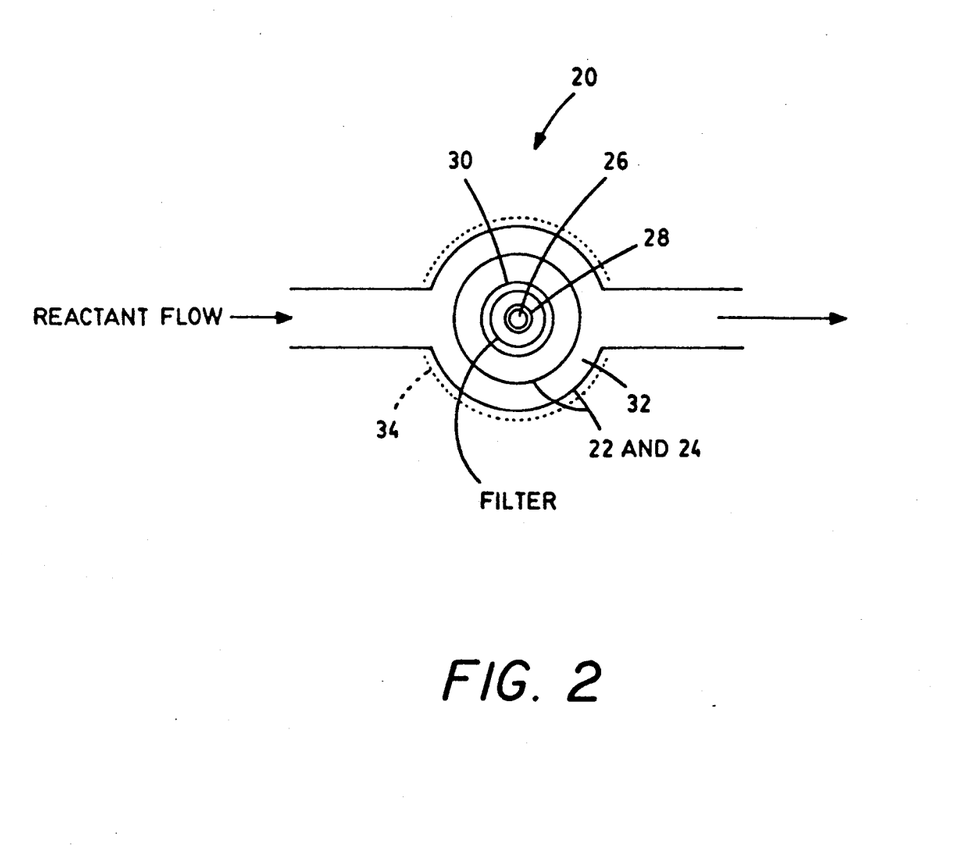
FIG. 2 is a cross-sectional view of a quartz reactor vessel of the present invention, designed to be used with an excitation lamp and filter.

One preferred photochemical reactor of the present invention is illustrated in FIG. 2, which shows a cross sectional view of a reactor vessel 20 designed to be used with an excitation lamp and filter in accordance with the teachings of the present invention. Here the inner and outer chambers 22 and 24 are made from quartz so that the unused radiation can pass through the reactor wall. The lamp discharge tube 26 containing Hg enriched in $^{196}Hg$, is surrounded by a lamp cooling jacket 28 to control the Hg vapor density (cold spot temperature) and lamp wall temperature.

The radiation from the lamp 26 passes through an annular cavity 30 containing natural mercury and transmits essentially only the $^{196}Hg$ component of the 253.7 nm hyperfine structure. This radiation then passes into the reaction zone 32. The reaction zone is preferably an annular gap of about 10 mm in the preferred embodiments discussed herein. As will be described infra, most of the radiation is not absorbed but hits the quartz outer wall 24.

Unlike previously used glass reactors, an outside reflector 34 is preferably used herein to direct back transmitted radiation into the reaction zone thus improving the utilization of photon flux. Furthermore, the effect of multiple passes of primary radiation is to reduce the non-$^{196}Hg$ component because this is readily absorbed by these isotopes due to their higher concentration. Then any scrambling, i.e., formation of $Hg_2Cl_2$ with non-$^{196}Hg$ isotopes, due to primary excitation of non-$^{196}Hg$ isotopes is reduced. This leads to higher enrichment.

In short the use of a quartz chamber with an outside reflecting surface increases the photon utilization and improves the spectral filtering of the primary radiation.

The importance of this multiple reflection apparatus can be seen by considering several parameters for the isotope separation under optimum operating conditions. The following terms should aid the skilled artisan in both understanding and practicing the present invention:

| | |
|---|---|
| Q: | Hg feedstock flow rate (mg/hr) |
| $Y^{196}/Y$: | Concentration of $^{196}Hg$ in Product |
| $Y_{th}$ | Theoretical product formation rate in (mg/hr) |
| U: | Fraction of feedstock $^{196}Hg$ in product |
| n: | average mercury density in reaction zone (atom/cm$^3$) |
| $Q_{HCl}$ | HCl flow rate (sccm) |
| $Q_{He}$ | Helium flow rate (sccm) |
| $P_{TOT}$: | Total HCl and Helium pressure (Torr) |
| $P_i$ | Net power input to excitation lamp (watts) |
| I: | Maximum rate of 253.7 nm (2537 Å) photon emission by excitation source for given input power (photons/s) |
| $I_R$ | Estimate rate of 253.7 nm photons into reaction zone (photons/s) |
| W: | Net Lamp input power |
| G: | Fraction of discharge emitting useful radiation |
| $E_F$: | Lamp efficiency in producing 253.7 nm |
| $T_F$: | Transmission efficiency of Hg vapor filter |
| $F_{196}$: | Fraction of radiation in 196 component |
| $T_G$: | Transmission through 4 quartz walls |
| $I^O$: | Incident radiation |
| $I_t$ | Transmitted radiation |
| s: | Effective absorption cross section |
| x: | Thickness of absorption layer |
| $n_a$: | Density of absorbing atoms |
| A: | Fraction of incident radiation absorbed |

Tables I and II show values of these terms for two examples. In Example 1 no reflector is used whereas in Example 2 a reflector is used. As can be seen the use of a reflector substantially increases the $^{196}Hg$ utilization as well as increasing the enrichment.

TABLE 1

| PARAMETER | NO REFLECTOR EXAMPLE 1 | Al FILM REFLECTOR EXAMPLE 2 |
|---|---|---|
| Q (mg/hr) | 184 | 178 |
| $Y^{196}/Y$ (%) | 3.4 | 5.2 |
| $Y_{th}$ (mg/hr) | 0.9 | 1.1 |
| (atoms/hr) | 6 × 10$^{16}$ | 7 × 10$^{13}$ |
| U | 0.12 | 0.23 |
| n (at/cc) | 5 × 10$^{13}$ | 5 × 10$^{13}$ |
| $Q_{HCl}$ (sccm) | 200 | 200 |
| $Q_{He}$ (sccm) | 250 | 250 |
| $P_{TOT}$ (Torr) | 2.4 | 2.4 |
| $P_i$ (watts) | 40 | 32 |
| I (photons/s) | 52 × 10$^{18}$ | 42 × 10$^{18}$ |
| $I_R$ (photons/s) | 18 × 10$^{16}$ | 14 × 10$^{16}$ |

TABLE II

CALCULATION OF 253.7 nm IRRADIANCE INTO REACTION ZONE
$I_R = W \times G \times E_F \times T_F \times F_{196} \times T_G$

| | Example 1 | Example 2 |
|---|---|---|
| W | 40 w = 52 × 10$^{18}$ photons/s | 32 w = 42 × 10$^{18}$ photons/s |
| G | 0.42 | 0.42 |
| $E_F$ | 0.10 | 0.10 |
| $T_F$ | 0.50 | 0.50 |
| $F_{196}$ | 0.33 | 0.33 |
| $T_G$ | 0.4 | 0.4 |
| $I_R$ (photons/s) | 18 × 10$^{16}$ | 14 × 10$^{16}$ |

The higher enrichment is due, at least in part, to further removal of primary radiation that could excite non-$^{196}Hg$ atoms as the radiation passes through the cell. This is due to the fact that the 253.7 nm radiation is absorbed approximately as $$A = 1 - I_t/I_o = 1 - e^{-nsx}$$

Assuming all the radiation transmitted into the cell corresponds to the Hg-196 component then $n_a$ corresponds to the $^{196}$Hg density or $$n_a = 0.146 \times 10^{-2} \times 5 \times 10^{13} \text{ at/cc}$$
$$= 6 \times 10^{10} \text{ at/cc}$$
Also
$$s = 2 \times 10^{-13} \text{ cm}^2$$
$$x = 1 \text{ cm}$$

so that A=0.01
and the number of absorbed photons in one pass of radiation through the reaction zone is 0.01 $I_R$.

Thus for Example 1 this corresponds to $0.01 \times 18 \times 10^{16} = 18 \times 10^{14}$ photons/s and for Example 2, $14 \times 10^{14}$ photons/s. 1 mg/hr of product formation corresponds to $8 \times 10^{14}$ reactions/sec. Given the fact that each absorbed photon may not result in product formation and that the estimate of $I_R$ is no more accurate that ±50% these numbers support the idea that the reaction rate is limited by the number of available photons. The small value of A is also limiting the reaction rate. Thus one might expect that increasing n.x would increase A and therefore the reaction rate.

The use of a reflector improves the photon utilization since instead of passing through the reaction region only once, the photons are reflected back into the reaction region.

The low $^{196}$Hg density results in a small A value. Other isotopes have much higher abundances so that after one pass the excitation radiation is substantially more depleted in one excitation component compared to $^{196}$Hg After reflection the re-incident radiation is better filtered and thus scrambling via direct excitation of non-$^{196}$Hg isotopes is reduced.

Thus use of a reflecting surface enhances the photochemical enrichment process of $^{196}$Hg both in photon utilization and reduction of primary excitation scrambling.

Figure 3A:
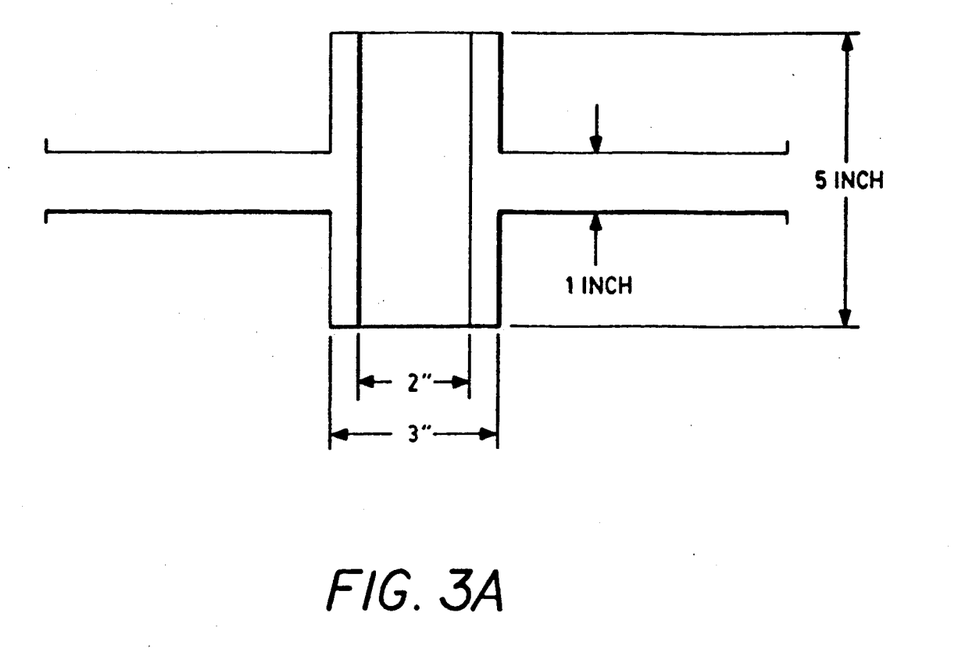
FIGS. 3A and 3B illustrate two views (side and top respectively) of a quartz reaction vessel to be coated with the preferred reflective aluminum coating of the present invention.
Figure 3B:
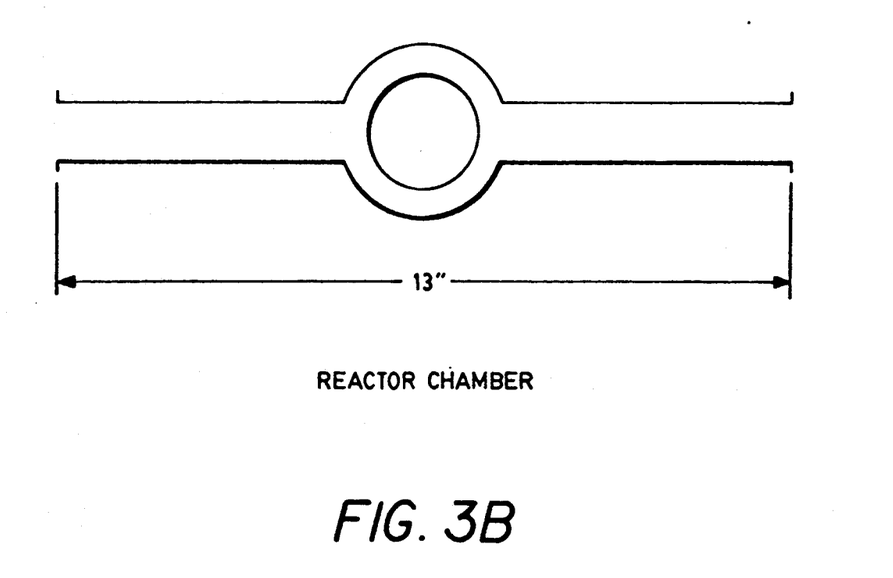

FIGS. 3A and 3B illustrate two views (side and top respectively) of a quartz reaction vessel to be coated with the preferred reflective aluminum coating of the present invention, namely by standard vacuum deposition methods. Placed at the center of the vessel is an intense source of 253.7 nm U.V. radiation which creates a photochemical reaction within the annular gap. For a single pass of the radiation only a small amount of the radiation is absorbed for the $^{196}$Hg reaction.

As described above, aluminum foil or similar reflective material can be used as an external reflector in such reactors. However, the preferred photoresist based material has a much higher reflectivity (factor of 2 or more) than Al foil and is therefore much more reflective. Additional coatings can be placed on the outside of the present aluminum film in order to retard and prevent scratching and corrosion thereof.

The use of a reflecting surface on the outside wall causes the U.V. radiation to be reflected back into the reactor thus improving the photon utilization with respect to the photochemical reaction. This reduces the cost of process as well as improves the spectral quality of the excitation radiation.

Figure 4:
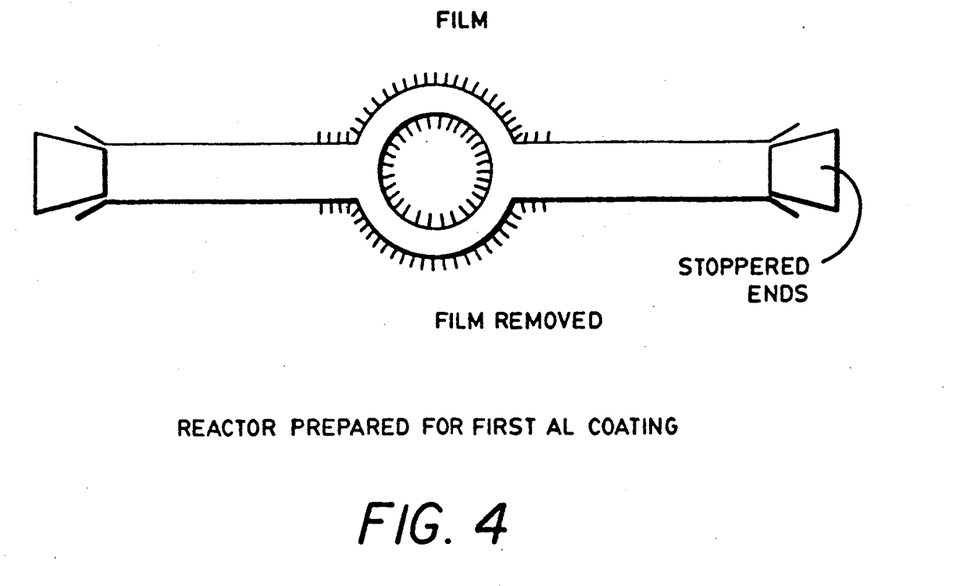
FIG. 4 illustrates the application of a first strippable coating to the reactor described in FIGS. 3A and 3B.

As illustrated in FIG. 4, the reactor vessel is first coated with a strippable vinyl film, typically Collodion or some other commercially available strippable material. This may be done with a brush or otherwise. Enough film is removed (by peeling) to expose about ¼ of the circumference of the cylinder for coating. Also, all openings and interior exposed surfaces are preferably covered or plugged as shown in FIG. 4.

Figure 5:
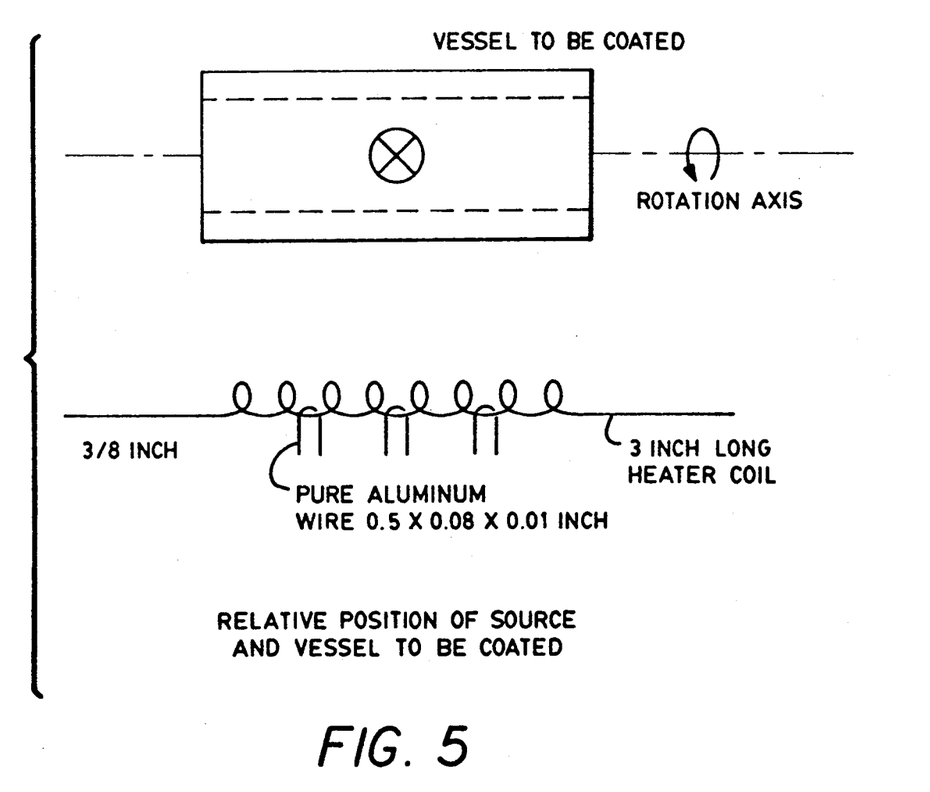
FIG. 5 illustrates the apparatus preferably employed to coat the quartz reactor vessel of FIG. 4 with the preferred aluminum film, which comprises a tungsten coil aluminum evaporation source.

The quartz reactor vessel is advantageously coated with the desired aluminum film by aligning it about above a Tungsten coil aluminum evaporation source, such as for example, that shown in FIG. 5. The reactor vessel, coated as depicted in FIG. 4, is aligned as shown in FIG. 5, preferably about eight (8) inches above the coil. The vacuum system is evacuated to $1 \times 10^{-4}$ Torr, and the aluminum charge on the coil is evaporated by applying approximately 800 watts of electric power through the coil.

The coated quartz reactor vessel is then removed from the coater. The aluminized area is covered with a strippable film, and the second quadrant is stripped off. The vessel is replaced in the vacuum coater with the bare side facing the coil, and coated with aluminum as above. This process is repeated 2 more times. The remaining vinyl film is removed from the vessel after coating.

Figure 6:
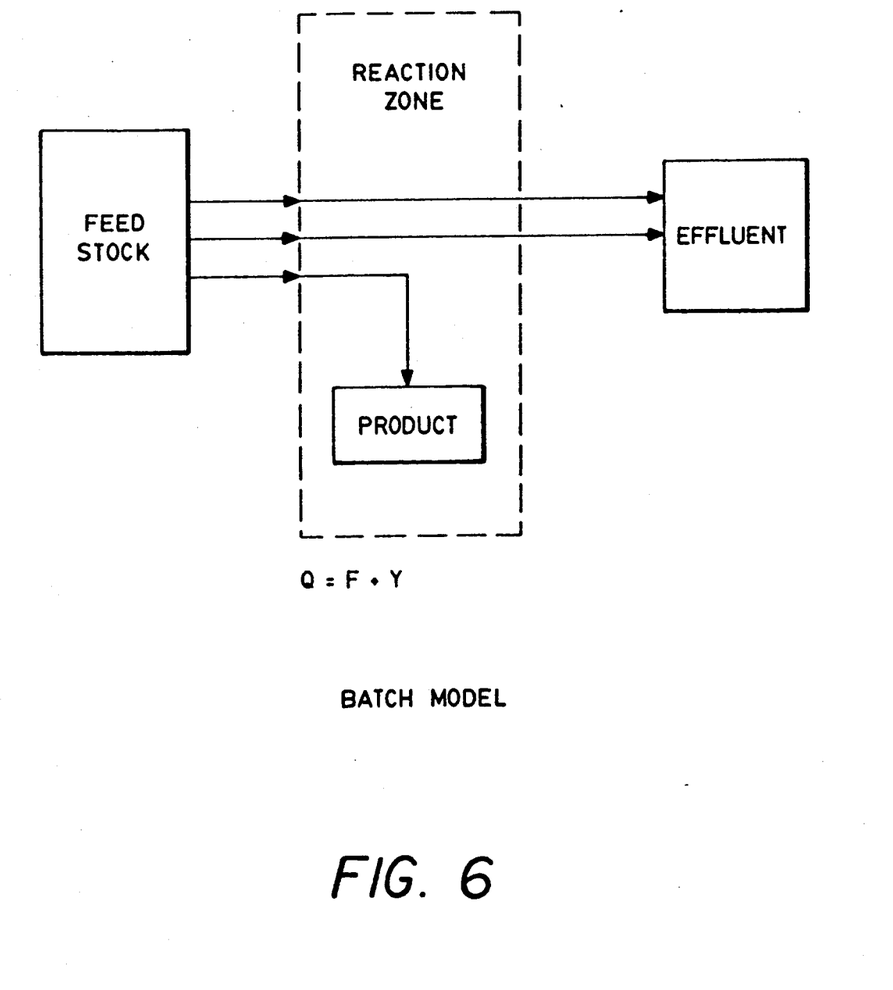
FIG. 6 is a photochemical $^{196}$Hg enrichment reactor system which can utilize a very high percentage of the $^{196}$Hg in the natural mercury feedstock.

In a second preferred embodiment of the present invention (which may utilize the reflectors described above), reference is made to the photoreactor illustrated in FIG. 6.

FIG. 6 is a photochemical $^{196}$Hg enrichment reactor system which can utilize a very high percentage of the $^{196}$Hg in the natural mercury feedstock. Produce yields ranging from about 10 to $10^3$ times higher than previously obtained are now possible.

FIG. 6 shows a "batch" description of the photochemical system of the present invention, as used to enrich $^{196}$Hg. Batch quantities represent times averaged, over the total run time, as well as spatially averaged, averaged over the total reactor surface where product is deposited. One can show that:

$$Y = Q(U/E) \qquad (1)$$

In Equation (1), Q, Y, E, and U are the feedstock flow rate, product yield, enrichment factor, and utilization factor, respectively. Q and Y are measured in g/hr. E is the ratio of the concentration of $^{196}$Hg in the product to that in the feedstock and U is the fraction of $^{196}$Hg removed from the feedstock due to product formation.

For a small pilot system, i.e., a system designed to supply sufficient enriched mercury to build from 10 to $10^3$ fluorescent lamps a day, each lamp requires 0.015 g Hg containing $^{196}$Hg at a level $\geq 2.5\%$.

As can be seen from Equation (1) Y is maximized when U is as close as possible to its maximum value, which is 1.0. Various processes can limit the yield.

Gunning and Swartz, *Adv. Photochem.*, 1: 209 (1963) and Webster and Zare, *J. Phys. Chem.*, 85: 1302 (1981) discuss some of the basic chemical phenomena involved in the photochemical enrichment of $^{196}$Hg. These publications are hereby incorporated herein by reference as general background material.

Workers at GTE Sylvania have found that photon starvation can be an important factor in typical enrichment operations. This problem can be overcome for example by increasing the light source brightness (photons emitted per unit surface area of the lamp). However, there are disadvantages to this in terms of decreasing efficiency and lamp lifetime. Given the microwave light source traditionally used, only limited gains appeared to be readily obtained by this approach.

Thus, the present invention is directed to another method of increasing the number of photons emitted in such operations, namely, increasing the lamp length. A heuristic model of the flow system was developed in order to explore the effect of a long reactor. The principle of operation of the long reactor of the present invention relies upon the assumption of "plug" flow of mercury vapor and carrier gas. In "plug" flow, a volume of reactants (HCl, He, Hg, etc.) moves through a uniformly illuminated region of the reactor at a constant speed equal to the mean flow velocity. Within this volume element we only consider Hg atoms. In this light, the following terms are defined to assist those skilled in this art in understanding the present invention:

$n = {}^{196}Hg$ ground state density, $6^1S_o$
$n^* = {}^{196}Hg\ 6^3P$ density
$a_e = Hg(6^1S_o \rightarrow 6^3P)$ excitation rate
$t^1 = Hg(6^3P \rightarrow 6^1S_o)$ decay time
$R$ = rate of product formation Effects of non-$^{196}Hg$ atoms as well as other chemical effects could be taken into account with the same format but the main points can be made with this restricted model.

The following rate equations can be written for the moving volume element:

$$dn/dt = -na_e + (n^*/t^1)$$

$$dn^*/dt = -R - (n^*/t^1) + na_e$$

If one assumes R is proportional to $n^*$, i.e., $R = cn^*$
Then $$dn^*/dt = -cn^*(-n/t^1) + na_e$$

If we define $$1/t_e = c + 1/t_e^;$$

Then $$dn^*/dt = -n^*/t_e + na_e, \text{ and}$$

$$dn/dt = (n^*/t_e) - na_e$$

These equations lead to the solution:

$$n = B_1 e^{P+S} + B_2 e^{P-T}$$

$$n^* = A(e^{P+t} - e^{P-t})$$

where:

$$A = (a_e n_o)/I$$

$$B_1 = (A/t^1)/(P_+ + a_e)$$

$$B_2 = (-A/t^1)/(P_+ a_e)$$

$$P_\pm = -(\tfrac{1}{2})(a_e + (1t_e)) \pm (\tfrac{1}{2})I \text{ and}$$

$$I = [((1/t_e) + a_e)^2 - 4a_e((1t_e) - (1/t^1))]^{\tfrac{1}{2}}$$

Since both $P_+$ and $P_-$ are less than or equal to zero, $n^*$ is the sum of two decaying exponentials.
One notes that:

$$(1/t_e) - (1/t^1) = c$$

Under non-photon starved conditions:

$$a_e >> 1/t_e$$

so that the sum of $[(1/t_e) + a_e]$ is still approximately equal to $a_e$;

and $$c/a_e << 1$$

Thus:

$$I = (a^2 - 4ca_e)^{\tfrac{1}{2}} = a_e(1 - (2c/a_e))$$

and $$P_\pm = -\tfrac{1}{2}a_e \pm \tfrac{1}{2}a_e(1 - (2c/a_e))$$

so that $$P_+ = -c$$

and $$P_- = -a_e$$

$A = n_o$ where $n_o$ is the $^{196}Hg$ density at $t = o$.
And $$n^* = n_o(e^{-ct} - e^{-a\ t})$$

This is the approximate solution of $a_e >> 1/t_e$.

In this model t can be replaced with $z/v$, where z is the longitudinal displacement of the volume element, and v is its velocity.
Thus, $$n^* = n(e^{-c/vz} - e^{-a/vz}).$$

Figure 7:
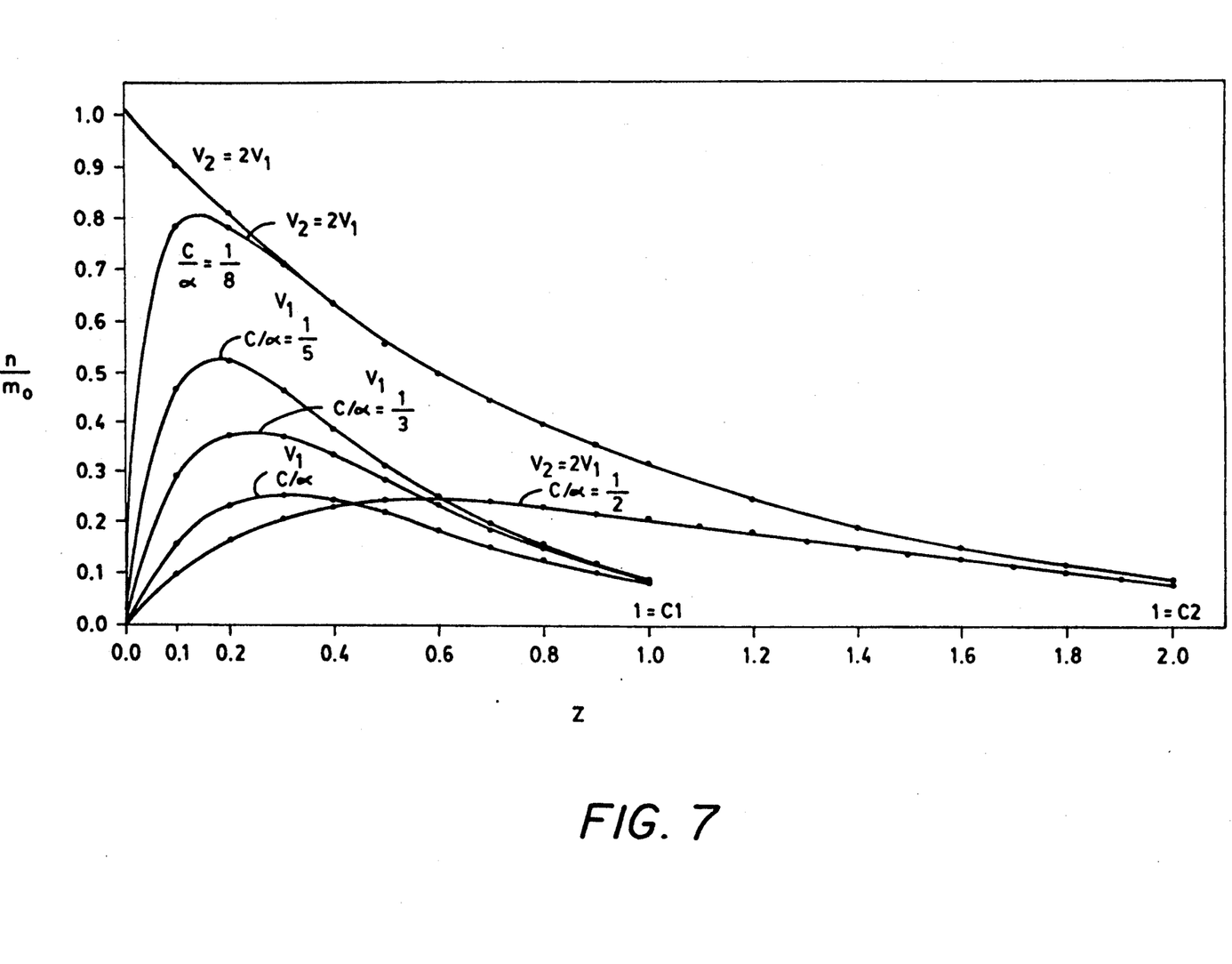
FIG. 7 shows a graph of $n^{(*)}/n_o$ versus z which is also the total deposited product versus z.

FIG. 7 shows a graph of $n^*/n_o$ versus z which is also the total deposited product versus z. The meaning of the two exponential terms can be seen from solving the case in which $c = 0$. The exact solution in this instance is:

$$n = \frac{n_o(1/t_e)}{a_e + 1/\tau_e} \left(1 + \frac{e^{-(a_e + 1/t_e)z/v}}{1/\tau_e}\right)$$

$$n^* = \frac{n_o a_e}{a_e + 1/\tau_e} (1 - e^{-(a_e + 1/t_e)z/v})$$

Figure 8:
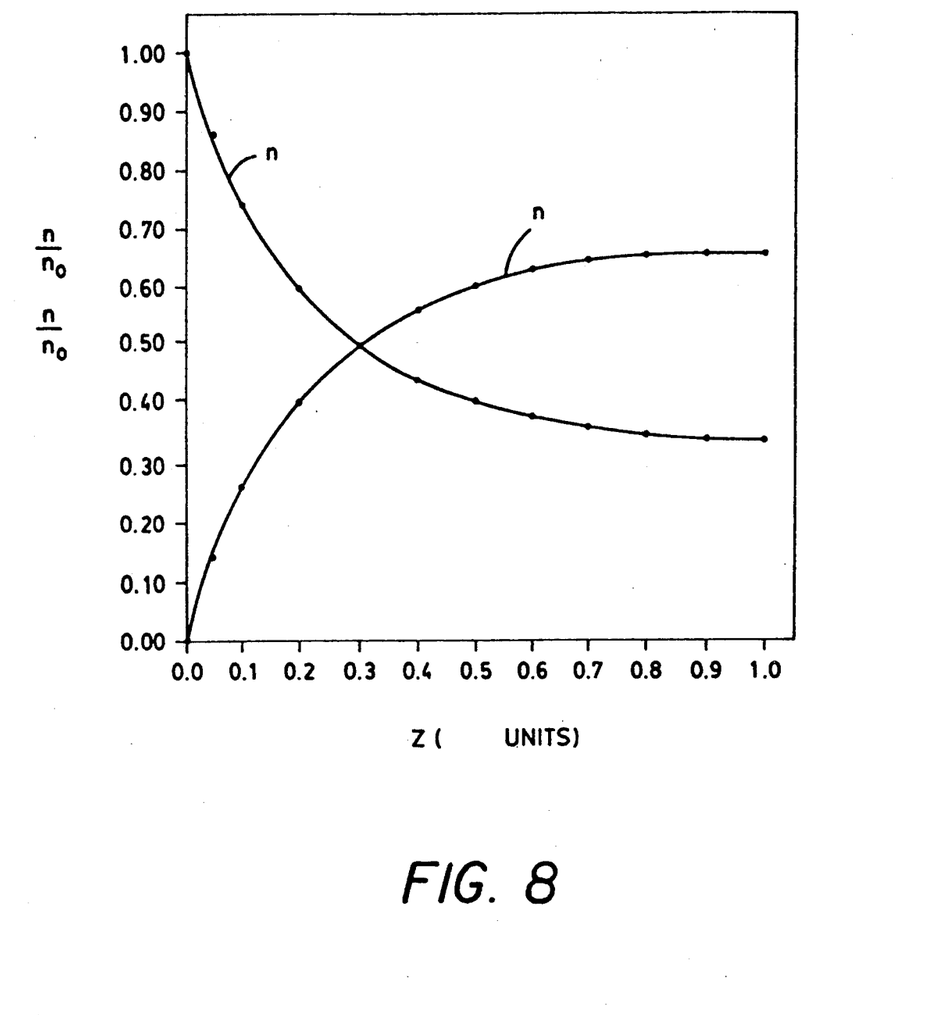
FIG. 8 is a graph of $n^{(*)}/n_o$ versus z, for the case where c=0.

Similarly, FIG. 8 is a graph of $n^{(*)}/n_o$, wherein for the case where $c = 0$. For z large enough n and $n^*$ approach constant values, i.e., $z >> v/(a_e + 1/t_e)$.

In FIG. 8, the initial transient represents approach to steady state population of n and $n^*$ due to $a_e$ processes. For $a_e >> 1/t_e$ only excitation affects the rate of this change. Thus for the case of FIG. 10, the fast decaying exponential $e^{-a/v}$ represents the approach to a steady state n and $n^*$ population whereas $e^{-c/vz}$ represents a loss term in $n^*$ due to product formation.

In FIG. 7 $z_c$ represents the reactor length. Clearly $z_c$ should be large enough to include most of $n^*$. This effectively maximizes U. Referring back to Equation (1) one sees that once U is maximized and E is at the minimum acceptable level then the only way to increase Y further is to increase, Q, the mercury flow rate.

We have demonstrated that Q is proportional to the carrier gas flow velocity. Thus increasing v increases Q. The effect of this is shown in FIG. 7 where $v_2 > v_1$. Clearly to deposit a quantity of product such that $n^*$ is as low for $v_2$ as for $v_1$ $z_{c2}$ must be larger than $z_{c1}$. In other words, one method of increasing Y is to increase v, but $z_c$ should also be increased to maintain the highest U and therefore the highest Y possible.

Figure 9A:
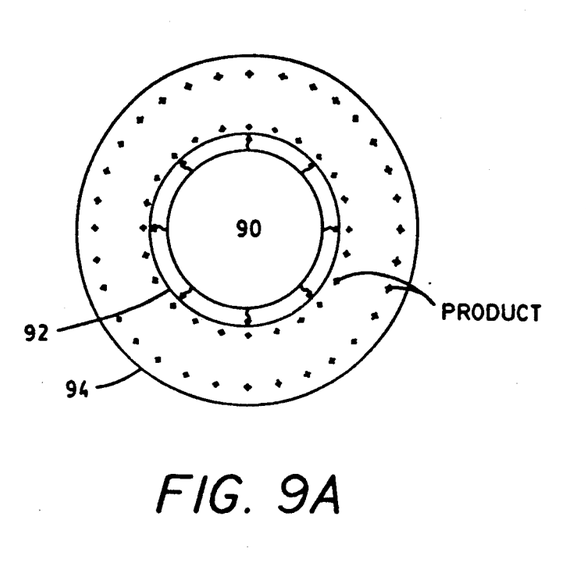
FIGS. 9A and 9B illustrate two views (top and cross-sectional) of a high utilization reactor prepared in accord with the present invention. The coaxial arrangement of the light source and the quartz reactor walls provides for uniform light intensity over the entire reactor length.
Figure 9B:
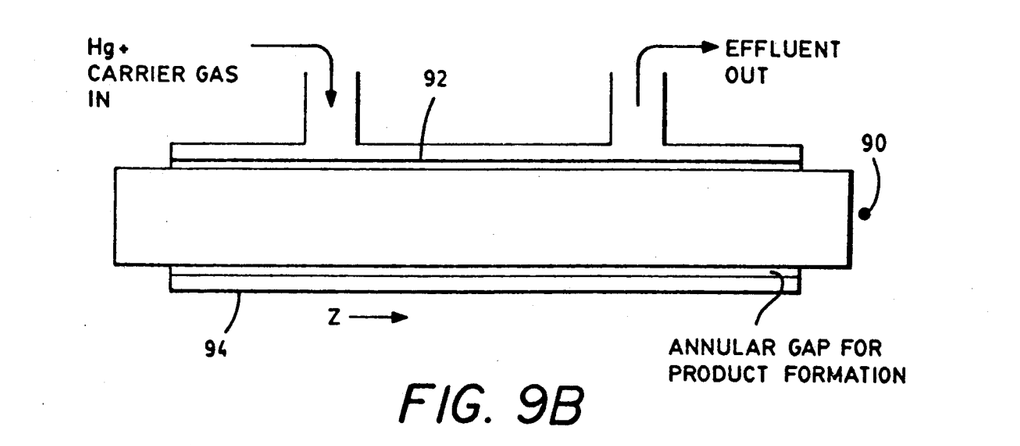

One preferred reactor geometry which can function according to these principles is shown in FIGS. 9A and 9B. The coaxial arrangement of the light source 90 and the quartz reactor walls 92 and 94, provides for uniform intensity over the entire reactor length, which can readily be lengthened. One preferred embodiment of the depicted reactor system was operated as a 15 inch long version. Typical run conditions and results for this reactor are provided in Table 3.

TABLE 3

Typical Operating Conditions for High Utilization System

| | |
|---|---|
| Reactor Length | 40 cm |
| Reactor Gap | 1 cm |
| Lamp Parameters | |
| Length | 40 cm |
| Diameter | 1 cm |
| Gas Fill | 2.5 T Argon |
| Current | 1.0 Amp |
| Cold Spot Temp. | 20° C. |
| Wall Temp. | 60° C. |
| $^{196}$Content | 50% |
| Filter Parameters | |
| Length | 40 cm |
| Gap | 1 cm |
| Gas Fill | 10 T Hydrogen |
| Cold Spot Temp. | 40° C. |
| $^{196}$Hg Content | 0.07% (50% that of natural Hg) |
| Process Parameters | |
| Mercury Density | 25 mT |
| Q Mercury Flow Rate | 2 g/hr |
| HCl flow rate | 0.2 slm (standard liters per minute) |
| He flow rate | 0.2 slm |
| HCl pressure | 2 Torr |
| He pressure | 2 Torr |
| Total Pressure | 4 Torr |
| Y Yield | 0.4 g/hr |
| E Enrichment factor | 3 |
| U Utilization factor | 0.6 |

All of the standard elements of the reactor system, i.e., the lamp, the filter, and the reactor vessel are formed of a material which is transparent to the desired excitation radiation, particularly 253.7 nm 2537 Å) for $^{196}$Hg. One preferred material is quartz. While the lamp used in the reactor of the present invention may be any low pressure (e.g., about 2.5 Torr) electric discharge type lamp which transmits radiation of about 253.7 nm, those using microwave cavities for the excitation are preferred.

An especially preferred lamp comprises an electroded mercury-inert gas lamp. At least two electrodes are positioned and sealed at each end of a sealed lamp envelope which contains mercury vapor and one or more inert gases. The sealed lamp envelope is surrounded at least in part by an elongated tube which defines a region for controlling a heat exchange medium which controls the temperature of the inner, sealed lamp envelope.

In one embodiment, uniform temperature is created in the Hg lamp by circulating $H_2O$ at a predetermined temperature about an isolated section of the lamp. Other fluids, or inert gases such as argon, helium, xenon and neon, can be selected depending on their boiling point behavior to provide the desired uniform temperature of the inner discharge envelope.

The circulating heat transfer medium also prevents the formation of $O_3$ (ozone) by purging $O_2$ in the vicinity of the lamp. Ozone is created when $O_2$ is exposed to 185 nm radiation which may be emitted by the lamp. Ozone, in turn, absorbs various wavelengths of radiation emitted from the lamp. This is undesirable because radiation having a wavelength of 253.7 nm, useful for the photochemical separation of $^{196}$Hg, is absorbed of $O_3$. Thus, in a preferred embodiment, a fluid or inert gas is circulated about the entire exterior of the lamp envelope, thereby purging all of the $O_2$ from the immediate vicinity of the envelope. This allows for a greater emission intensity of the particular, desired radiation from the lamp envelope.

In a preferred embodiment, the outer lamp jacket comprises a quartz cylinder. This outer jacket serves several purposes. First, it allows for the use of a gas purge, if desired, for eliminating $O_2$ about the transmission section, thereby reducing $O_3$ formation. Second, if the outer jacket is designed to be demountable, it permits the interchange of different inner lamp envelopes. This makes possible the isolation of different Hg isotopic distributions using the same outer jacket. Also, lamp envelopes having different diameters can be used to affect the emitted linewidth of radiation.

The fact that the outer tube can be demountable allows for the use of outer tubes of different types of materials which can selectively filter certain emitted wavelengths. For example, by changing the outer tube material to Vycor 7910, it is possible to filter wavelengths below 200 nm thereby eliminating ozone formation in the region surrounding the lamp.

Figure 10:
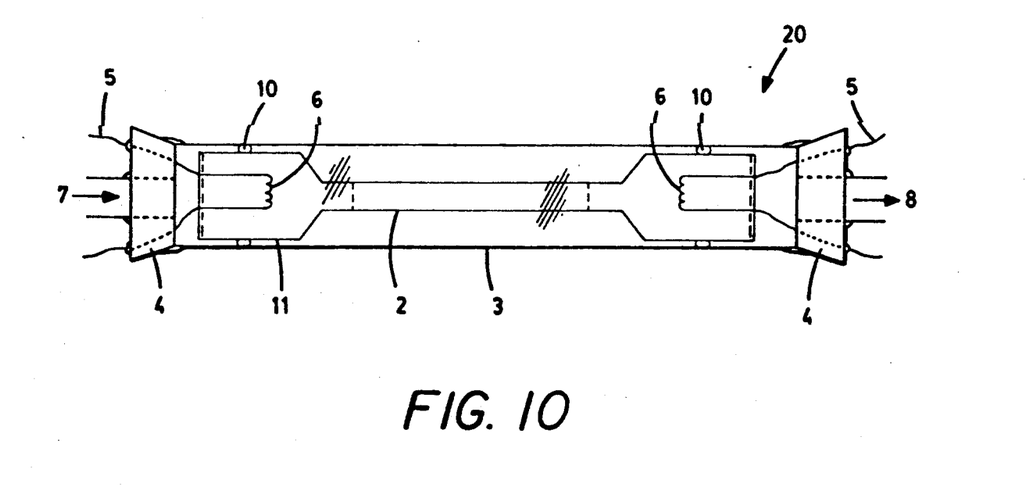
FIG. 10 illustrates one preferred monoisotopic lamp used in the photoreactors of the present invention.

FIG. 10 illustrates the preferred lamp which is used in the reactor of this invention.

The mercury lamp 20 of FIG. 10 comprises an inner lamp envelope 2 and an outer jacket 3. In the preferred embodiment, both the envelope 2 and the outer jacket are constructed of quartz. The envelope 2 can be of various diameters depending on the desired optical depth. A larger diameter provides greater power density and broader bandwidth. For the isotopic separation of $^{196}$Hg, the inner diameter of the envelope is typically about 10 nm. The envelope 2 typically contains a source of Hg such as elemental Hg as well as an inert gas such as argon. However, any inert gas which is compatible with Hg vapor can be used. Typically, between about 1 and 2 mg of Hg is contained within lamp envelopes which have an inner diameter of about 10 mm. The length of the lamp can be from about 30–150 cm with a preferred length of about 40 cm.

A tapered stopper 4, typically of an elastomeric material, is disposed at each distal end of the outer jacket 3 and serves to substantially center the outer jacket around at least one section of the envelope 2. Furthermore, the tapered stopper guides and positions an electrode lead 5 through both the stopper and the outer jacket, and into the envelope where it provides current for the electrodes 6. In the preferred embodiment, the electrodes are shaped as coils and able to withstand a current of at least about 5 amperes. The tapered stoppers also contain openings in their centers which provide for an inlet 78 and outlet 8 stream of circulating heat transfer medium which is preferably water. The heat transfer medium circulates about at least one portion of the inner discharge envelope 2. The heat transfer medium then exits the lamp at outlet 8 contained in the outer jacket. Tubes, 11, preferably comprising a heat resistant glass are connected to each end of the envelope to provide regions to contain the electrodes and to further provide regions for mounting the envelope within the jacket. These tubes 11 are preferably separated from the outer tube with spacers 10 preferably comprising elastomeric materials. It is pointed out that the spacers 11 must have openings which allow the heat transfer medium to travel through the lamp.

The temperature of the inner envelope 2 is controlled by the temperature of the circulating heat transfer medium. As the temperature of the heat transfer medium is increased or decreased, the corresponding temperature of the inner envelope also increases or decreases. The linewidth of the emitted radiation is typically affected greatly by temperatures between 15° C. and 50° C. The emission intensity depends strongly on the temperature of the inner envelope.

The entire lamp assembly can be placed within a mercury vapor filter. In one preferred embodiment, the filter comprises a hollow, axial elongated torus containing mercury vapor and an inert gas. This structure can be formed by the combination of two tubes, preferably quartz, where an inner tube is inserted into an outer tube and the tubes are sealed at both ends. This encloses a medium which can be made to contain a gaseous Hg vapor medium which transmits wavelengths of light desirable for the photochemical separation of $^{196}$Hg or specific isotopes of Hg.

In a preferred embodiment of this invention $^{196}$Hg is produced by enriching mercury compounds using radiation with a wavelength of 253.7 nm. The control of the specific wavelength is very dependent upon the vapor equilibrium temperature within the lamp envelope, which depends, in turn, upon the lowest temperature within the envelope. The vapor pressure of Hg within the envelope (for useful mercury isotope separation) and the intensity of the emitted radiation are proportional with a variation of about 10–15%.

If the intensity of radiation emitted from the lamp increases, the corresponding linewidth of the emitted radiation also increases. This causes other isotopes of mercury to become excited. Such an effect is undesirable, as it leads to a separation which yields a product having lower isotopic specificity. Thus, it is important to control the vapor pressure of the lamps to ensure that radiation of the proper linewidth is emitted. For a further explanation of the relationship between lamp temperature, radiation intensity and linewidth of the radiation see Maya et al., *Science*, 26: 435–436 (1984), the teachings of which are incorporated herein by reference.

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. A process of producing mercury isotopically enriched in $^{196}$Hg isotope comprising forming a feedstock comprising a predetermined concentration of $^{196}$Hg isotope, flowing said feedstock through a reactor at a predetermined flow rate to isotopically enrich said isotope and yield a product enriched in said isotope, said reactor comprising a source of light in the form of a tube having a diameter of about 10 millimeters for producing mercury excitation radiation of about 2537 Å and a glass reaction chamber for photochemically reacting mercury, said glass being selected so as to filter wavelengths below about 200 for reducing ozone formation wherein the exterior surface of said glass comprises a reflective coating formed thereon by the use of photoresist masking for completely coating the exterior surface without coating the interior surface, said reactor comprising a gas inlet and outlet ports situated so as to define a gas flow path along a reactor length of at least about 40 cm to about 150 cm, a filter arranged concentrically around the lamp, adjusting said predetermined flow rate of said feedstock for substantially maximizing said yield of a product enriched in said isotope for said reactor length, and selecting a reactor length for obtaining a desired yield of product enriched in said isotope wherein said yield increases with increasing reactor length.

* * * * *